United States Patent

Katano et al.

[19]

[11] Patent Number: 6,088,535
[45] Date of Patent: *Jul. 11, 2000

[54] INTERCHANGEABLE LENS CAMERA AND INTERCHANGEABLE LENS BARRELS WITH MULTIPURPOSE DRIVE MECHANISM

[75] Inventors: Yuji Katano, Kawasaki; Hiroshi Wakabayashi, Yokohama; Hidenori Miyamoto, Urayasu, all of Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/938,965

[22] Filed: Sep. 26, 1997

Related U.S. Application Data

[63] Continuation of application No. 08/551,180, Oct. 31, 1995, abandoned.

[30] Foreign Application Priority Data

Oct. 31, 1994 [JP] Japan .................................. 6-267152

[51] Int. Cl.[7] .................................................. G03B 13/00
[52] U.S. Cl. .................................. 396/72; 396/79; 396/132
[58] Field of Search .................................. 396/72, 75, 77, 396/79, 132, 133

[56] References Cited

U.S. PATENT DOCUMENTS

| | | | |
|---|---|---|---|
| 4,488,798 | 12/1984 | Iida et al. ............................. | 396/133 X |
| 4,682,871 | 7/1987 | Metabi ................................ | 354/485 X |
| 5,014,077 | 5/1991 | Yomogizawa et al. ................. | 354/187 |
| 5,432,584 | 7/1995 | Suzuki et al. .......................... | 354/187 |

*Primary Examiner*—David M. Gray
*Attorney, Agent, or Firm*—Oliff & Berridge, PLC

[57] ABSTRACT

A camera for use with interchangeable lens barrels that can be attached to and detached from the camera body has a drive mechanism that provides the generating source for the drive power of drive elements inside each lens barrel built into the camera body. The connecting structure that provides a connection between the camera body and lens barrels varies according to the type of lens barrel, for example, whether the lens barrel contains a fixed focal length lens or a variable focal length lens. So, the functions realized by the drive of the drive elements from the drive mechanism vary according to the type of lens barrel.

17 Claims, 14 Drawing Sheets

INTERCHANGEABLE LENS CAMERA AND INTERCHANGEABLE LENS BARRELS WITH MULTIPURPOSE DRIVE MECHANISM

This is a Continuation of application Ser. No. 08/551,180 filed Oct. 31, 1995 now abandoned.

BACKGROUND OF THE INVENTION

1. Field of the Invention

The present invention relates to a camera wherein lens barrels can be interchanged.

2. Description of Related Art

With this type of camera, there is a device that conveys the drive power of the drive mechanism inside the camera body (for example, a motor and deceleration gear train) to the lens barrel and drives the optical focusing system of the shooting lens in the direction of the optical axis.

With the type of camera explained above, functions realized when the lens barrel is driven by a drive mechanism inside the camera body have been limited to a single function of focussing without regard to the type of lens barrel. However, there are devices in which drive elements other than optical focussing systems (such as variable power optical systems including zoom lens systems) are built into the lens barrel. There are devices in which the drives actuators (motors), especially for zoom lens variable power movement, are incorporated into the inside of the lens barrel. Generally, variable power movement load is larger than the load for focussing. Also, in general, fixed focal length lenses are smaller than zoom lenses. Thus, the load for focussing of a fixed focal length lens is less than for a zoom lens. Thus, when fixed focal length lens focussing and zoom lens focussing are performed by an actuator installed within a camera body, the actuator is inefficient because the actuator is more powerful than necessary.

SUMMARY OF THE INVENTION

An object of the present invention is to provide an interchangeable lens camera with a single drive mechanism inside the camera body that drives drive elements in different interchangeable lens barrels to perform different functions.

In an embodiment of the present invention, an interchangeable lens camera includes a camera body to which different types lens barrels can be attached to and detached and in which a drive mechanism, which constitutes the generation source of the drive power of drive elements inside the lens barrels, is built into the camera body. The connecting structure that establishes connection between the camera body and the individual lens barrels is varied according to the type of lens barrel so that the functions realized by the drive of the drive mechanism to drive each of the drive elements vary according to the particular lens barrel attached.

The interchangeable lens barrels of the present invention include information providing elements that provide the camera body with the information necessary to determine the lens barrel type.

The camera body of the present invention is equipped with a control device to operate the drive mechanisms according to prescribed control conditions, a determining device to determine the attached lens barrel type, and a control conditions changing device to change control conditions based on the determined result of determining device, so that the functions realized by the movement of the drive mechanisms change according to the attached lens barrel types.

In particular, the connecting structure for the drive mechanisms and lens barrels may be varied according to the attached lens barrel type. So, when the shooting lens inside the lens barrel is of fixed focal length, focussing movement is performed by the drive of the drive element. Also, when the shooting lens is of variable focal length, variable power movement is performed by the drive of the drive element. In that case, the information providing element in the interchangeable lens barrels provides to the camera body the information to distinguish whether the shooting lens inside the attached lens barrel is of fixed focal length or variable focal length.

An interchangeable lens barrel of an embodiment of the present invention equipped with a variable focal length shooting lens includes focusing mechanisms that constitute the generating source for the drive power of the focussing optic system of the shooting lens that is built into the lens barrel.

In an embodiment of the present invention, the determining device determines whether the shooting lens attached inside the lens barrel is of fixed focal length or variable focal length. The control conditions changing device controls a shooting lens with fixed focal length drive mechanisms to move the shooting lens for focussing and controls a shooting lens with variable focal length drive mechanisms to move the shooting lens for variable power movement.

In an embodiment of the present invention, the functions realized when the drive elements of the lens barrels are driven by the drive mechanisms of the camera body vary according to lens barrel type attached to the camera body. In an interchangeable lens camera, because of the desire to make lens barrels smaller, it is easier to make a drive mechanism with a large drive power in the camera body than in the lens barrel. Thus, if a large load drive element inside the lens barrel is driven by drive mechanisms of the camera body, and the other drive element inside the lens barrel is driven by drive mechanisms inside the lens barrel, the lens barrel can be made smaller while effectively using the drive power of drive mechanisms of the camera body. When there is only one drive element inside the lens barrel, if it is driven by drive mechanisms of the camera body, there is no need to build a drive mechanism into the lens barrel.

In an embodiment of the present invention, when a lens barrel equipped with a variable focal length lens is attached to the camera body, a variable power drive element of the lens barrel is driven by the drive mechanisms of the camera body, and variable power movement is performed. Because, in general, drive power is bigger for variable power operation that moves the entire optic system than for a focusing operation that moves only a part of the optic system, performing variable power with the drive mechanisms of the camera body enables reducing the size of the lens barrel when using a variable focal length lens. When using a single focus lens, there is no need to perform variable power. So, focussing is performed by the drive mechanisms of the camera body, and there is no need to build a focusing drive mechanism into the lens barrel.

BRIEF DESCRIPTION OF THE DRAWINGS

The invention will be described in detail with reference to the following figures in which like reference numerals refer to like elements, and wherein.

DETAILED DESCRIPTION OF PREFERRED EMBODIMENTS

Figure 1:
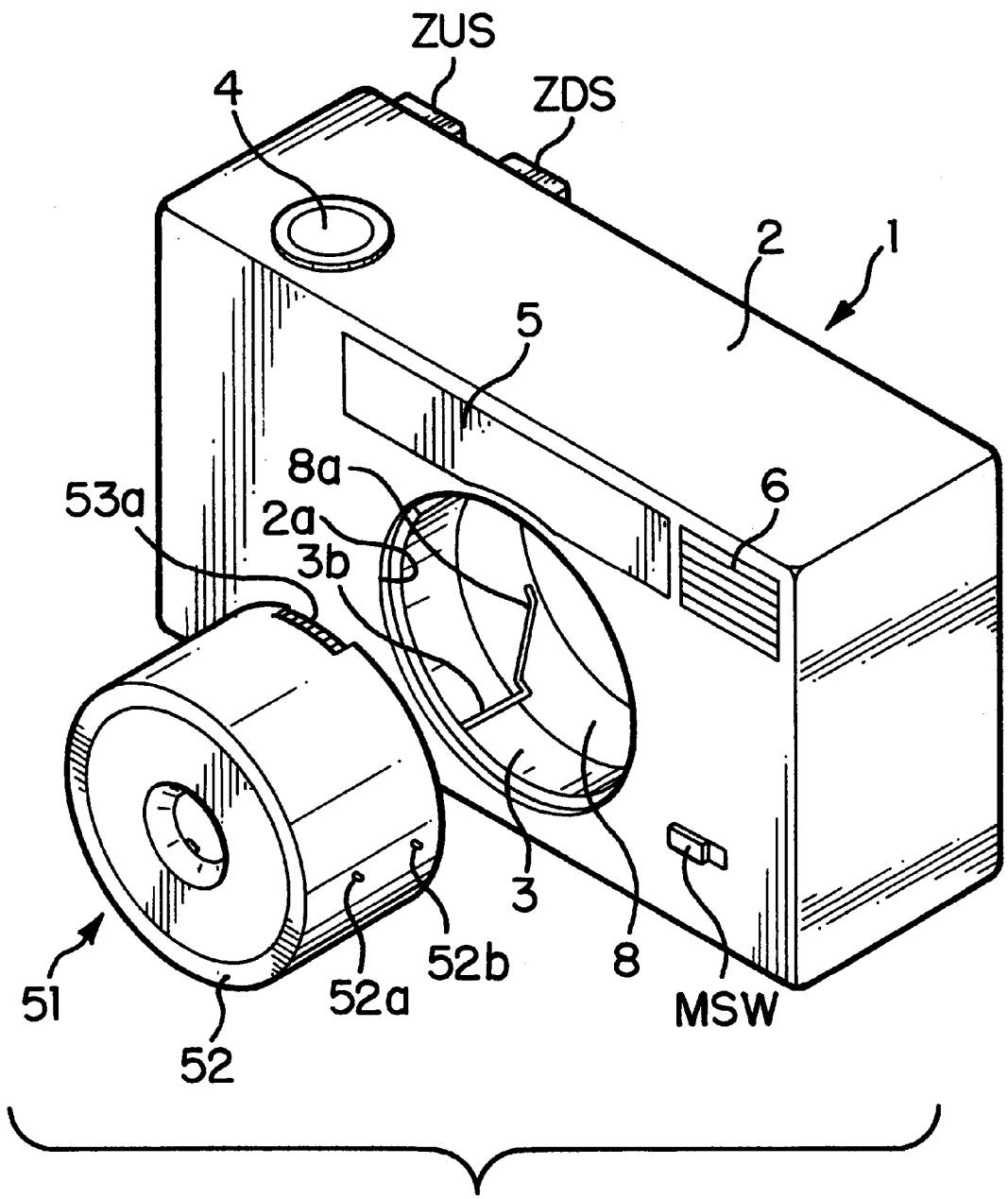
FIG. 1 is a top front perspective view of the interchangeable lens camera and a fixed focal length lens barrel of an embodiment of the present invention.

An embodiment of the present invention is explained hereafter, with reference to FIG. 1–FIG. 15. FIG. 1 is a perspective front view of the interchangeable lens camera of the present embodiment, including a camera body 1 and a removable lens barrel 51. The camera body 1 includes a cover 2, that defines the exterior of the camera, and a frame 3 that is inside cover 2. Frame 3 is made by, for example, injection molding a resin material. Frame 3 is used as a structure to wall off the cartridge chamber, spool chamber, etc. inside the camera, and also as a base to which are attached other types of devices that the camera includes (for example, film advancement device, range finder, and photometry equipment). On the top face of cover 2 is attached a release button 4. On the upper part of the front face of cover 2 are a window 5 and a flash device 6. Inside window 5 are attached known photometry equipment, a range finder, and a finder optical system. On the near face of cover 2 are attached a zoom up switch ZUS and a zoom down switch ZDS to direct variable power movement of the zoom lens. On the front face of cover 2 is a power supply switch MSW for the camera. Details of the control system for the camera are given later.

Figure 2:
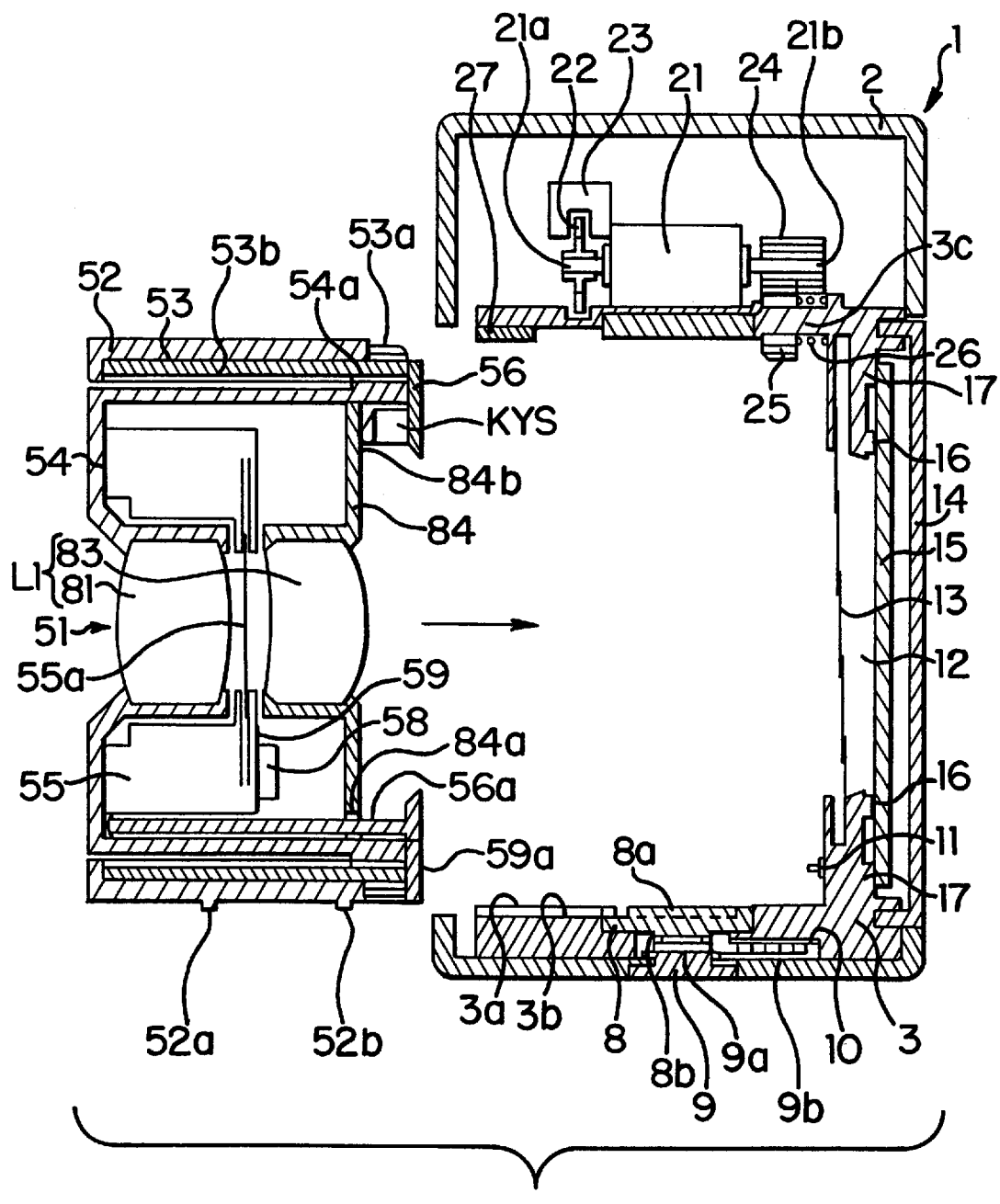
FIG. 2 is a side cross-sectional view of the state before attaching the lens barrel equipped with a single focal length lens to the camera body of FIG. 1.
Figure 8:
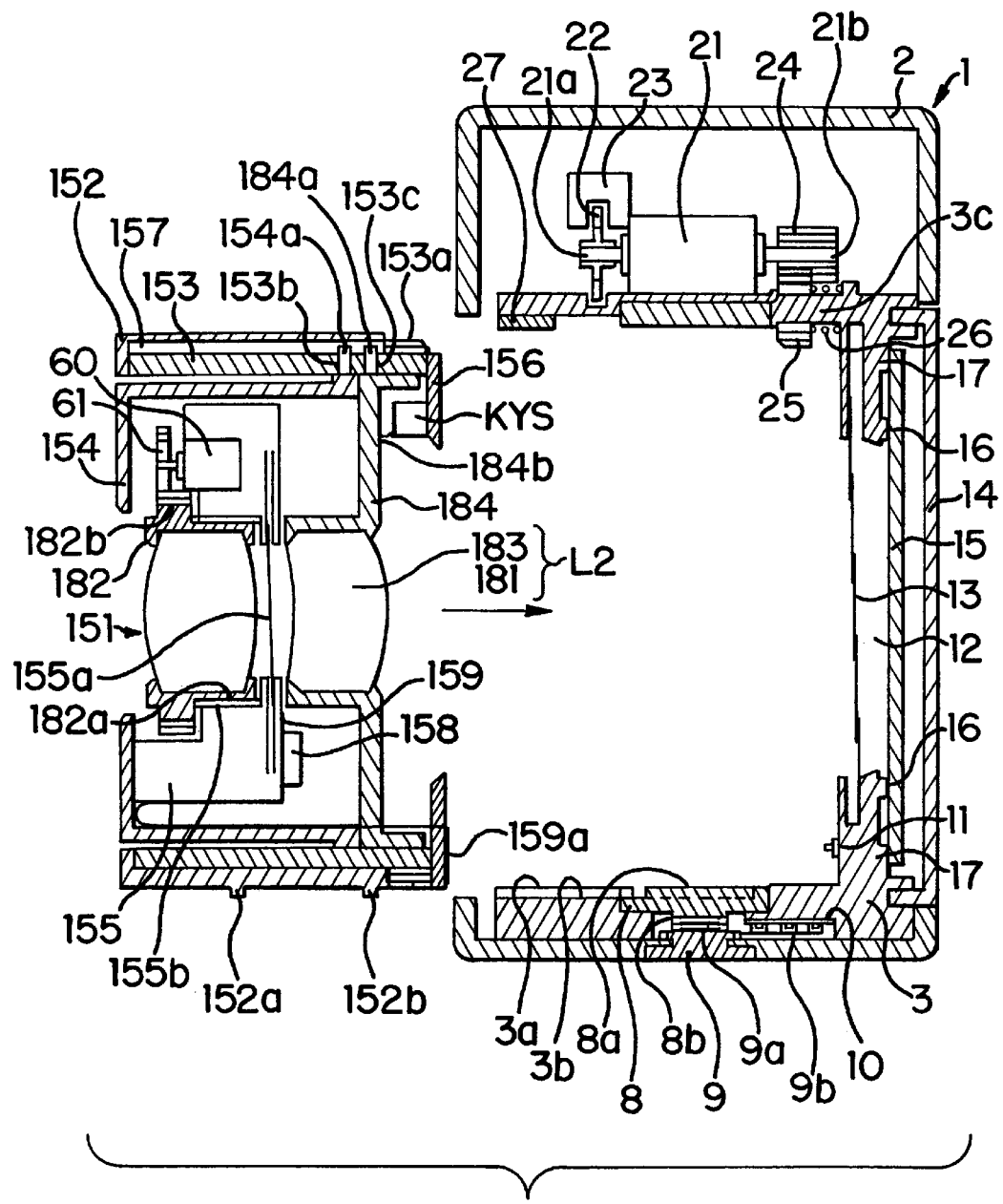
FIG. 8 is a side cross-sectional view showing the state before attaching a lens barrel equipped with a variable focal length lens to the camera body of FIG. 1.

In the center of the front face of cover 2 is a molded circular aperture part 2a to accept lens barrel 51, which includes a fixed focal length lens, or lens barrel 151, which includes a variable focal length lens (see FIG. 2 and FIG. 8 respectively). Into frame 3 is a molded lens barrel acceptor hole 3a, coaxial with aperture part 2a. Into the back of lens barrel acceptor hole 3a is positioned an attach-detach ring 8. On the inner surface of lens barrel acceptor hole 3a and attach-detach ring 8 are a molded rotation restriction groove 3b and a cam groove 8a. Grooves 3b and 8a are described later. Lens barrel acceptor hole 3a is coaxial with the optical axis of the lens barrel attached to camera body 1. Hereafter, the axis line of lens barrel acceptor hole 3a will also be referred to as the optical axis.

Figure 3:
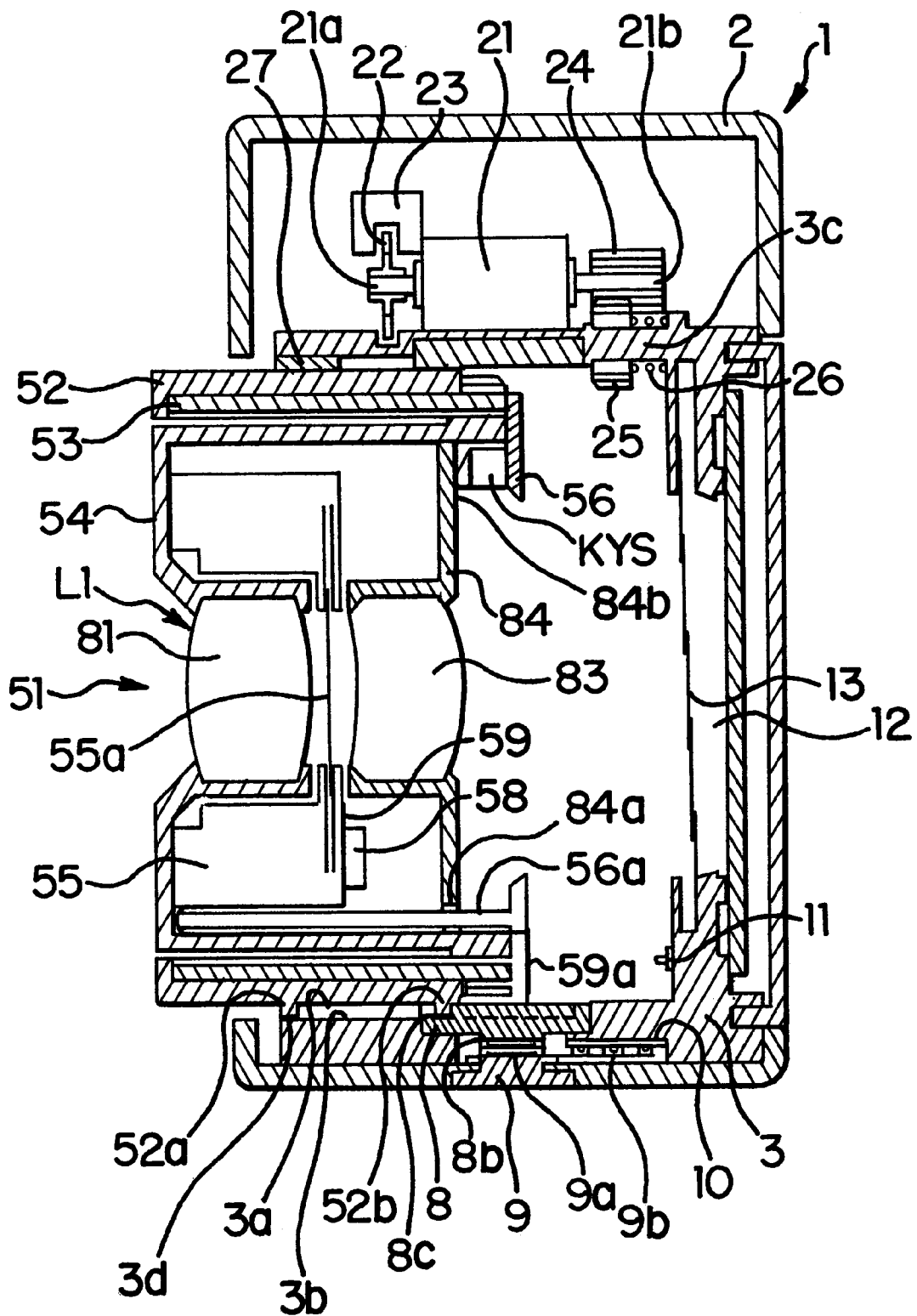
FIG. 3 is a side cross-sectional view showing the state when attaching the lens barrel equipped with a single focal length lens to the camera body of FIG. 1.
Figure 4:
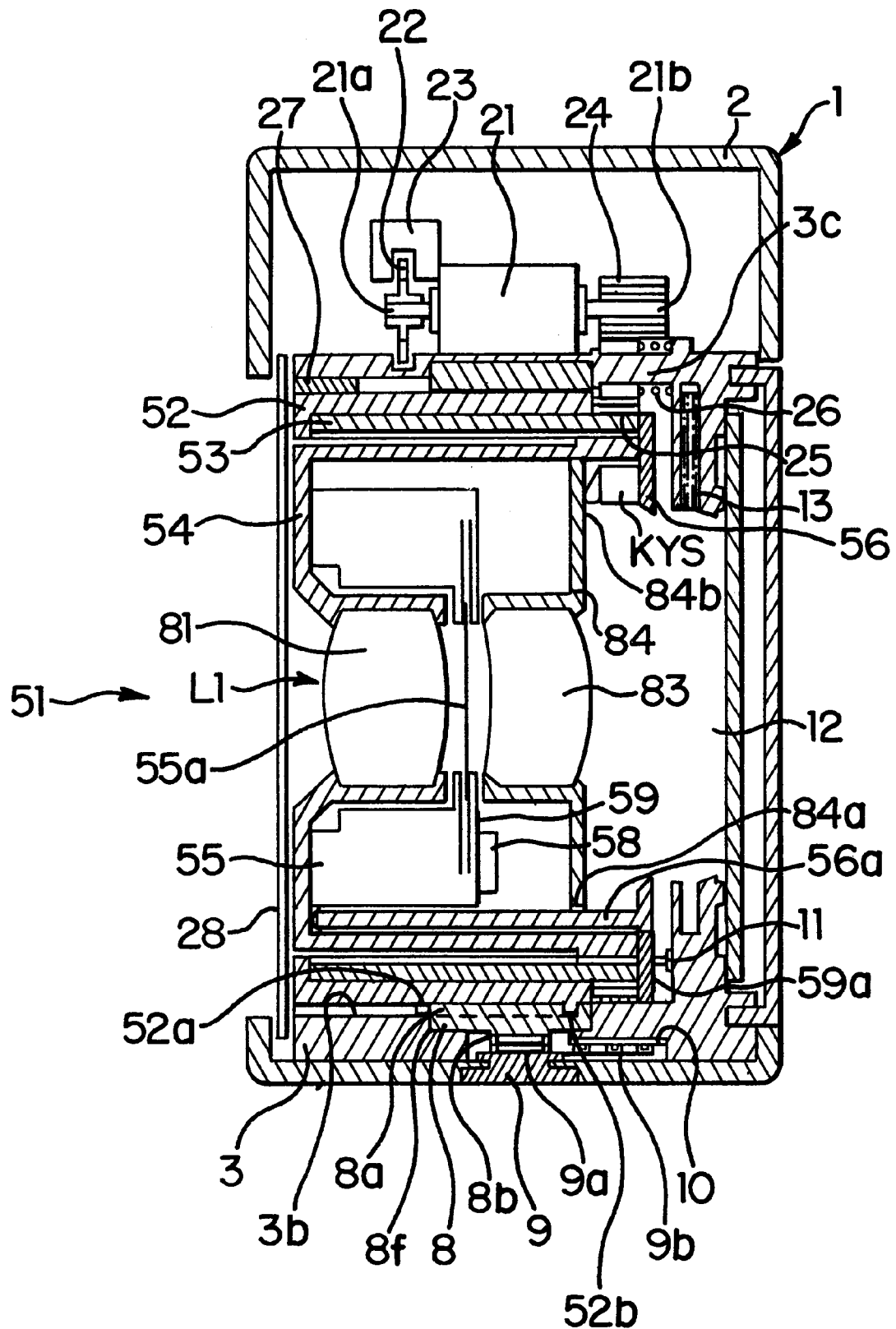
FIG. 4 is a side cross-sectional view showing the state after completing attachment of the lens barrel equipped with a single focal length lens to the camera body of FIG. 1.

FIG. 2–FIG. 4 are cross-sectional views showing the process when lens barrel 51, equipped with a single focal length lens (for example, focal length 35 mm), is attached to camera body 1 and used. As shown in FIG. 2–FIG. 4, attach-detach ring 8 is held by frame 3 so it can rotate around the optical axis. A lens barrel attach-detach lever 9 is coupled to the bottom face of cover 2. Lever 9 can be slid in the left-right direction of the camera (orthogonal to the plane of FIG. 2). On the inner side of lens barrel attach-detach lever 9 is a molded rack 9a, and on the outer surface of attach-detach ring 8 is a molded pinion gear 8b that engages rack 9a. Thus, when lens barrel attach-detach lever 9 is slid, attach-detach ring 8 is rotated around the optical axis. A brush 9b is attached to lens barrel attach-detach lever 9, and a printed circuit board 10 is disposed adjacent thereto on frame 3. When brush 9b moves on top of printed circuit board 10 together with sliding of lens barrel attach-detach lever 9, the on and off connection state between the multiple patterns built into printed circuit board 10 changes, and a signal corresponding to the position of lever 9 is output.

On the back face of frame 3, a contact pin 11 is positioned to obtain an electrical connection with lens barrel 51 upon assembly. A molded aperture 12 in frame 3 regulates the film exposure face shape (not shown in FIG. 1–FIG. 15). On the front part of aperture 12, a blind lid 13 is positioned to cover aperture 12. Blind lid 13 is similar to well known focal plane type shutters and uses multiple lid elements to cover aperture 12. When lens barrel 51 is attached, blind lid 13 is folded up at the top of aperture 12, as shown in FIG. 4, by a drive mechanism (not shown). The film (not shown) is placed between a pressure plate 15, attached to a rear cover 14, and an inner rail 16 of frame 3 and positioned in the direction of the optical axis. An outer rail 17 molded into frame 3 positions film in the vertical direction in FIG. 2.

A lens barrel drive motor 21 is attached on the upper part of frame 3. An output shaft 21A on one end of lens barrel motor 21 has a disc 22 attached. Slits are molded circumferentially into disc 22 at fixed intervals. On top of the outer surface of disc 22 is built a photointerruptor 23. The passages of the slits of disc 22, which is rotated by lens barrel motor 21, are read by photointerruptor 23, and a pulse signal corresponding to the rotation amount of lens barrel motor 21 is output from photointerruptor 23.

An output shaft 21b, on the other end of lens barrel motor 21, has a pinion gear 24 attached. Pinion gear 24 engages with a coupling gear 25. Coupling gear 25 is held in place so it can rotate around support shaft part 3c of frame 3 and move along the optical axis direction, and is biased toward the front of the camera (left part of FIG. 2) by a compression spring 26. To the inner face of lens barrel acceptor hole 3a is affixed a lens barrel holder part 27 (for clarity omitted in FIG. 1) made of a resilient material. As shown in FIG. 4, a lens barrier 28 blocks aperture part 2a. Lens barrier 28 is opened and closed by a drive mechanism (not shown). Open and closing controls for lens barrier 28 are explained later.

Next, lens barrel 51 is explained. Lens barrel 51 has an outer barrel 52, a drive barrel 53, and a movable barrel 54.

Figure 6:
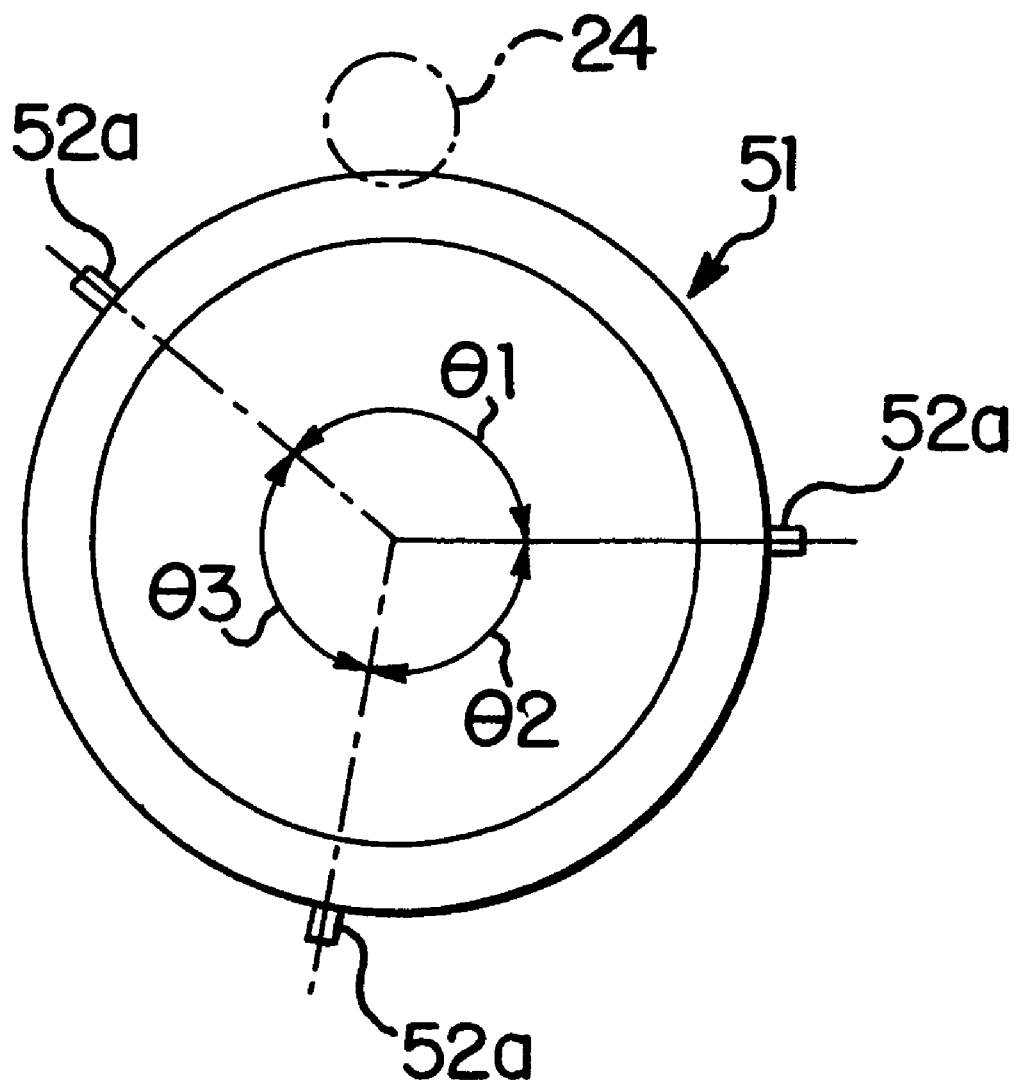
FIG. 6 is a drawing showing the arrangement of pins built onto the outer surface of the lens barrel.

Outer barrel 52 defines the exterior of lens barrel 51. As shown in FIG. 1, on the outer face of outer barrel 52 are a rotation restriction pin 52a and a cam pin 52b. These pins 52a and 52b are in the same number as rotation restriction groove 3b and cam groove 8a of camera body 1 (three, in this example). Because lens barrel 51 is always attached to the camera body at a fixed position relative to the circumference, as shown in FIG. 6, the angles of separation $\Theta_1$, $\Theta_2$, and $\Theta_3$, of the three rotation restriction pins 52a, are set unequally. Cam pin 52b is positioned to correspond to circumferential position of the rotation restriction pin 52a. In other words, rotation restriction pin 52a and cam pin 52b are aligned in a direction parallel to the optical axis.

As show in FIGS. 2–5, drive barrel 53 is supported so as to rotate freely within outer barrel 52 and is held along the optical axis between a plate 56, affixed to the rear end of outer barrel 52, and outer barrel 52 so that movement in the direction of the optical axis is prevented. On the outer surface of the rear end of drive barrel 53 is a lens barrel gear 53a that engages with coupling gear 25 of camera body 1. On the inner surface of drive barrel 53, a female helicoid screw 53b is positioned. A male helicoid screw 54a is molded on the outer surface of the rear end of movable barrel 54 to engage with female helicoid screw 53b. To the internal surface of movable barrel 54 are affixed a front lens unit 81 and shutter equipment 55.

Behind a shutter lid 55a of shutter equipment 55, a rear lens unit 83 is attached. A single focal length shooting lens L1 is constructed from front lens unit 81 and rear lens unit 83. Rear lens unit 83 is affixed to rear-unit holding barrel 84, which is affixed to movable barrel 54. Key groove 84a, molded into the bottom part of rear-unit holding barrel 84, and linear key 56a, built into plate 56, engage, and rotation of movable barrel 54 around the optical axis is prevented. Thus, when drive barrel 53 rotates, its rotation is converted to linear movement of movable barrel 54 by helicoid screws 53b and 54a, and front lens unit 81 and rear-unit lens 84 move together along the optical axis. In this way, the focus position of shooting lens L1 is changed. When movable barrel 54 has moved as far as possible toward plate 56, edge face 84b of rear-unit holding barrel 84 makes contact with lens barrel switch KYS, and lens barrel switch KYS turns on.

Shutter equipment 55 is connected to a flexible printed circuit board 59 (hereafter, FPC) having a fixed memory 58 attached thereto (hereafter EEPROM). Lens barrel switch KYS is also connected to FPC 59. Into EEPROM 58 is written information about shooting lens L1, including information to determine the lens barrel type, as well as information about, for example, focal length, F number, and displacement amount. FPC 59 extends along linear key 56a and has an edge with a connecting pattern 59a, which is exposed to the surface of plate 56. When lens barrel 51 is attached to camera body 1, connecting pattern 59a and contact pin 11 make contact, and signal transmission becomes possible between camera body 1 and lens barrel 51 (shutter equipment 55, EEPROM 58, and lens barrel switch KYS). Thus, FPC 59 and EEPROM 58 are part of a connecting structure specifically configured for lens barrel 51 that provides a connection between camera body 1 and lens barrel 51.

Figure 7A:
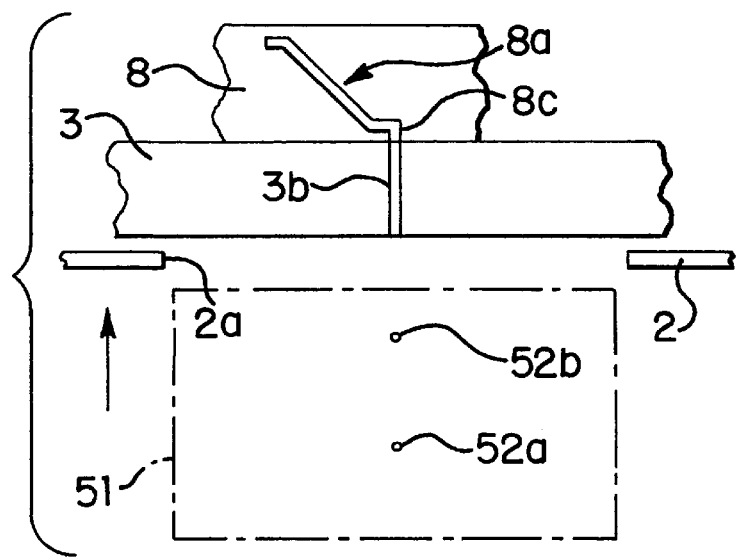
FIG. 7(a)–7(c) are drawings showing the relation of camera body grooves and lens barrel pins before, during, and after attachment, respectively, of the lens barrel to the camera body of FIG. 1.
Figure 7B:
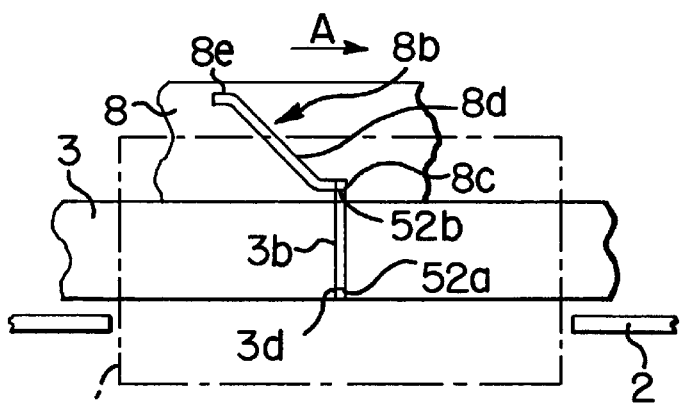
Figure 7C:
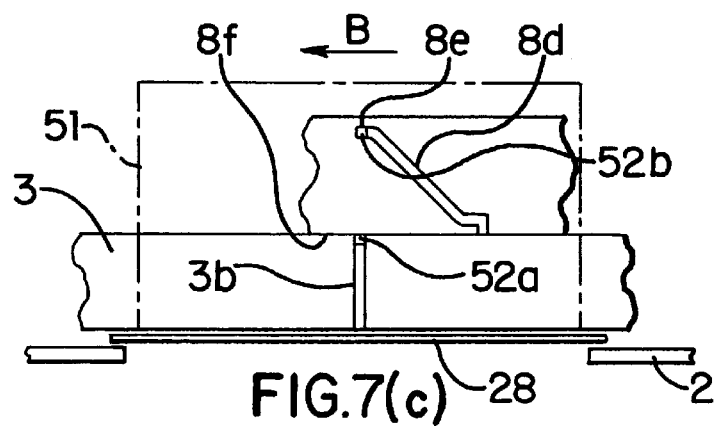

Next, attachment and detachment of lens barrel 51 is explained. FIGS. 7(a)–(c) show the relationship of pins 52a and 52b and grooves 3b and 8a when lens barrel 51 is attached to camera body 1, FIG. 7(a) corresponds to FIG. 2, FIG. 7(b) to FIG. 3, and FIG. 7(c) to FIG. 4. In addition, lens barrel acceptor hole 3a and attach-detach ring 8 are shown in their open state. As shown in FIG. 7(b), cam groove 8a has a linear part 8c, that extends along the optical axis, a spiral part 8d that extends along and around the optical axis, and a stopping part 8e, which extends along the circumference direction of attach-detach ring 8.

When lens barrel 51 is detached from camera body 1, rotation restriction groove 3b and linear part 8c come into contact, as shown in FIG. 7(a). When pins 52a and 52b are brought together with groove 3b and lens barrel 51 is inserted into camera body 1 from aperture part 2a, lens barrel 51 stops at the position where cam pin 52b runs into the end edge of linear part 8c, and rotation restriction pin 52a enters into entrance edge 3d of rotation restriction groove 3b, as shown in FIG. 7(b). At this time, lens barrel holding element 27, made of a resilient material, is pushed into lens barrel 51 and resiliently changes shape. Due to the restoring force of lens barrel holding element 27, lens barrel 51 is held in place as shown in FIG. 3. Thus, lens barrel 51 does not fall from the camera body even when a supporting hand is removed from it. In addition, a large coefficient of friction of the surface of lens barrel element 27 helps hold the lens barrel 51 in place.

When lens barrel attach-detach lever 9 (see FIG. 3) is slid from the FIG. 7(b) position in the lens barrel attachment direction, attach-detach ring 8 rotates in the direction of arrow A. Because of this, cam pin 52b moves through spiral part 8d to stopping part 8e, as shown in FIG. 7(c), and lens barrel 51 is inserted into camera body 1. At this time, because rotation restriction pin 52a is in contact with rotation restriction groove 3b, rotation of lens barrel 51 is stopped. When cam pin 52b moves in stopping part 8e, rotation restriction pin 52a contacts edge face 8f of attach-detach ring 8. Because of this, lens barrel 51 is restrained along the optical axis direction.

As shown in FIG. 4, in the process of lens barrel 51 being inserted, coupling gear 25 engages with lens barrel gear 53a. When the teeth of gears 25 and 53a interfere and cannot engage, coupling gear 25 compresses compression spring 26 and moves to the rear of the camera body. In this case, when coupling gear 25 is driven by lens barrel motor 21, coupling gear 25 is pushed forward by the power of compression spring 26 so that gears 25 and 53a interlock. When lens barrel 51 is to be detached, lens barrel attach-detach lever 9 is slid in the opposite direction from when attaching, and attach-detach ring 8 rotates in the direction of arrow B in FIG. 7(c).

FIGS. 8–11 are cross-sectional views showing the process of attaching lens barrel 151, having a variable focal length lens (for example, focal length 35–70 mm) to camera body 1 and using it. As is clear from FIGS. 8–11, lens barrel 151 has an outer barrel 152 and a drive barrel 153. Outer barrel 152 defines the exterior circumference portion of lens barrel 151. On the outside surface of outer barrel 152 are positioned rotation restriction pin 152a and cam pin 152b. The shape and positions of these pins 152a and 152b are the same as for pins 52a and 52b of lens barrel 51 explained above. The shape of outer barrel 152 is also the same as of outer barrel 52.

Drive barrel 153 is fitted into the inner circumference of outer barrel 152, so as to rotate freely, and is held along the optical axis between plate 156, which is affixed to the rear end of outer barrel 152, and outer barrel 152, so that individual movement is prevented. On the outer surface of the near end of drive barrel 153 is molded lens barrel gear 153a that engages coupling gear 25 of camera body 1. Lens barrel gear 153a is the same as lens barrel gear 53a. Inside drive barrel 153 are a movable barrel 154 and a rear-unit holding barrel 184. Movable barrel 154 and rear-unit holding barrel 184 are not fixed to each other and can move independently.

Shutter equipment 155 is located inside of movable barrel 154. A front lens unit holding barrel 182 is positioned onto the center of shutter equipment 155. Inside the front lens unit holding barrel 182 is a front lens unit 181. Behind shutter 155a of shutter equipment 155, rear lens unit 183 is attached. Rear lens unit 183 is attached to rear-unit lens holding barrel 184. A variable focal length shooting lens L2 is constructed from front lens unit 181 and rear lens unit 183. On the outside of front lens unit holding barrel 182 are positioned male helicoid screw 182a and a gear 182b. Gear 182b engages pinion gear 61 of a focusing motor 60, affixed to shutter equipment 155. When focussing motor 60 is activated, front lens group holding barrel 182 rotates, and that rotation is converted to linear movement of front lens group holding barrel 182 by helicoid screws 182a and 155b. Because of this, front lens unit 181 moves along the optical axis, and focus position of shooting lens L2 changes.

Two cam grooves 153b and 153c that twist around the optical axis are molded into drive barrel 153. The twisting angles of cam grooves 153b and 153c are different from each other. On the outside of movable barrel 154 and rear-unit lens holding barrel 184 are cam follower pins 154a and 184a. Cam follower pin 154a passes through cam groove 153b and engages linear guide groove 157 of outer barrel 152, and cam follower pin 184a passes through cam groove 153c and engages linear guide groove 157. Linear guide groove 152a is parallel to the optical axis direction. When drive barrel 153 rotates, cam follower pins 154a and 184a move linearly along the optical axis direction according to the twisting angle of cam grooves 153b and 153c, and front lens unit 181 and rear lens unit 183 move along the direction of the optical axis while changing their distance apart. In this way, the focal length of shooting lens L2 changes. When movable barrel 154 and rear-unit holding barrel 184 approach plate 156 as close as possible, edge face 184b of rear-unit holding barrel 184 makes contact with lens barrel switch KYS and lens barrel switch KYS turns on.

A flexible printed circuit board 159 (hereafter, FPC) is connected to shutter equipment 155. To this FPC 159 is attached fixed memory 158 (hereafter EEPROM). Lens barrel switch KYS and motor 60 are also connected to FPC 159. Into EEPROM 158 is written information about shooting lens L2, including information to determine the lens barrel type, as well as information about, for example, focal length, F number, and displacement amount. On the edge part of FPC 159 is positioned connecting pattern 159a, that is exposed to the surface of plate 156. When lens barrel 151 is attached to camera body 1, connecting pattern 159a and contact pin 11 make contact, and signal transmission becomes possible between camera body 1 and lens barrel 151 (shutter equipment 155, EEPROM 158, lens barrel switch KYS, and motor 60). Thus, FPC 159 and EEPROM 158 are part of a connecting structure specific to lens barrel 151 that provides a connection between camera body 1 and lens barrel 151.

Figure 9:
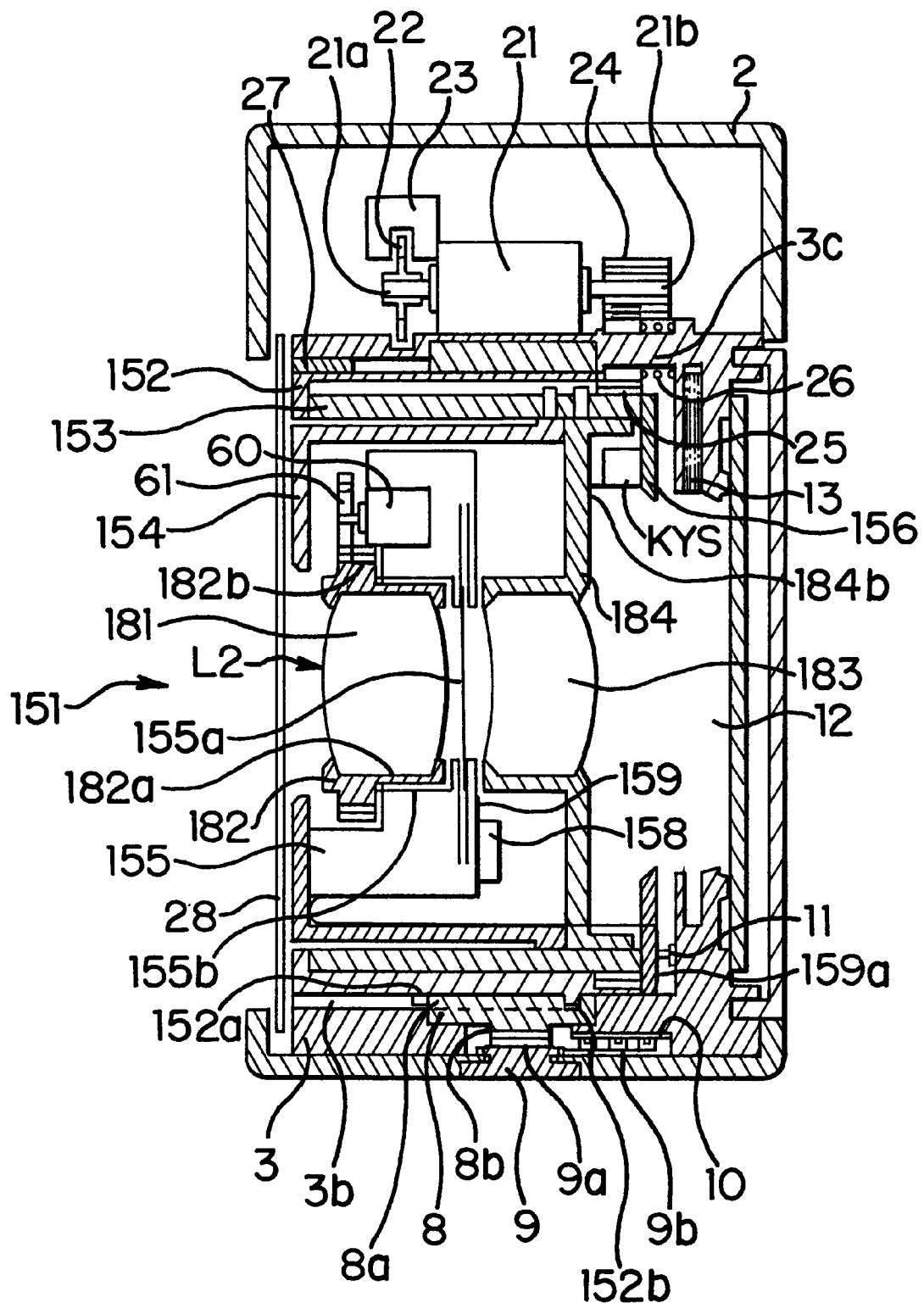
FIG. 9 is a side cross-sectional view showing the state after completing attachment of the lens barrel equipped with a variable focal length lens to the camera body of FIG. 8.

As with lens barrel 51 explained above, lens barrel 151 can be attached to camera body 1 as shown in FIG. 9, by rotating attach-detach ring 8 with pins 152a and 152b joined with grooves 3b and 8a of the camera body.

Figure 12:
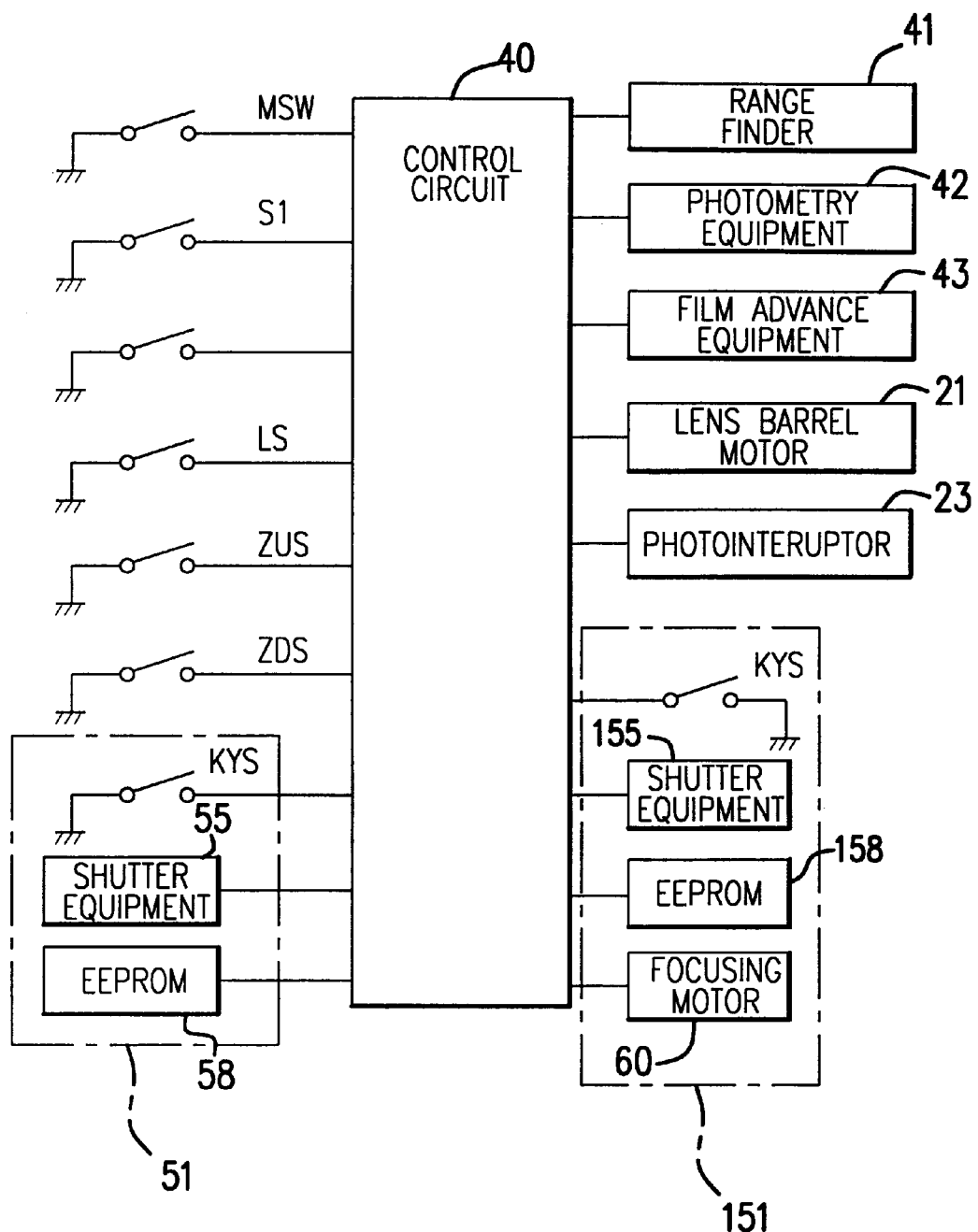
FIG. 12 is a block functional diagram of the control system of the camera of the present invention.

FIG. 12 is a block functional diagram of the control system for a camera of the present invention as described herein. A control circuit 40 is positioned inside camera body 1, equipped with a camera controller, such as, for example, a microcomputer. In the illustrated embodiment, the camera controller is implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts in FIGS. 13–15 can be used as the controller. As shown, a distributed processing architecture is preferred for maximum data/ signal processing capability and speed.

A well known range finder 41, photometry equipment 42, and film advancement equipment 43, in addition to photo-interruptor 23 and lens barrel motor 21 explained above are connected to control circuit 40. Range finder 41 and photometry system 42 are installed within window 5 (shown in FIG. 1). Also connected to control circuit 40 are power supply switch MSW, half depression switch S1, full depression switch S2, lens barrel attach-detach switch LS, zoom up switch ZUS, and zoom down switch ZDS. Half depression switch S1 is turned on by a half depression of release button 4 of FIG. 1, while full depression switch S2 is turned on by a full depression of release button 4. Lens barrel attach-detach switch LS is constructed of printed circuit board 10 and brush 9b of lens barrel attach-detach lever 9, and when lever 9 is moved in the lens barrel detach direction, LS is turned on by the first stage of its movement.

When lens barrel 51 is attached to camera body 1, shutter equipment 55, EEPROM 58 and lens barrel switch KYS make contact with control circuit 40. When lens barrel 151 is attached to camera body 1, shutter equipment 151, EEPROM 158, lens barrel switch KYS and focussing motor 60 make contact with control circuit 40. FIG. 12, for convenience of explanation, shows two types of lens barrel, 51, and 151, connected, but in reality only one lens barrel is attached at a time.

Figure 13:
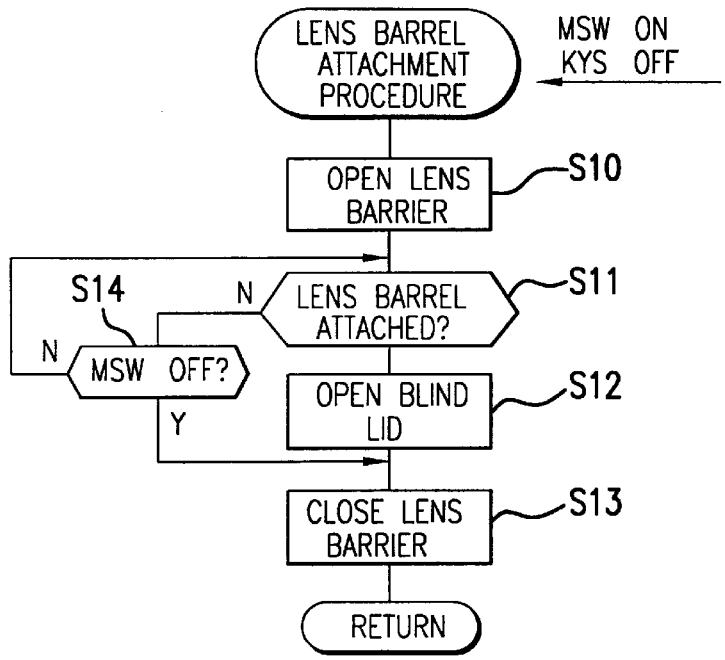
FIG. 13 is a flow chart showing the lens barrel attachment procedure performed by the control circuit of FIG. 12.
Figure 14:
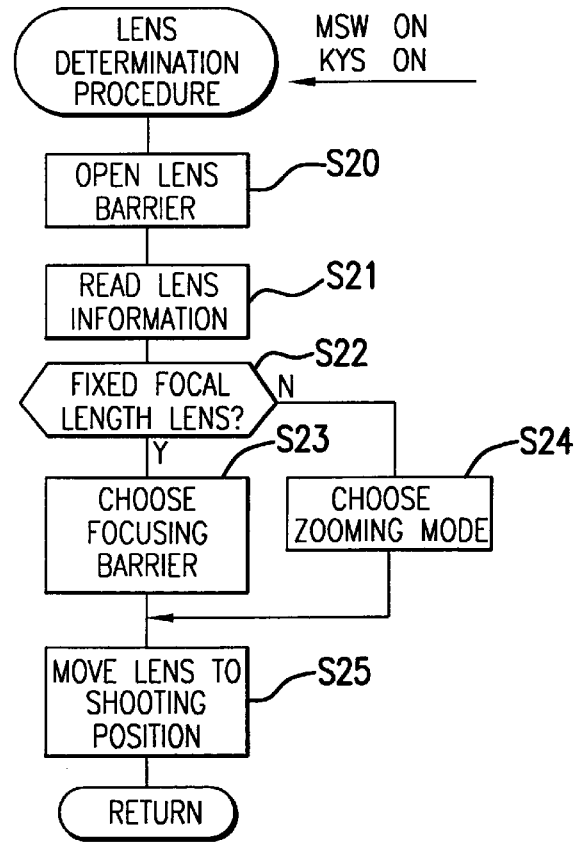
FIG. 14 is a flow chart showing the lens determination procedure performed by the control circuit of FIG. 12.
Figure 15:
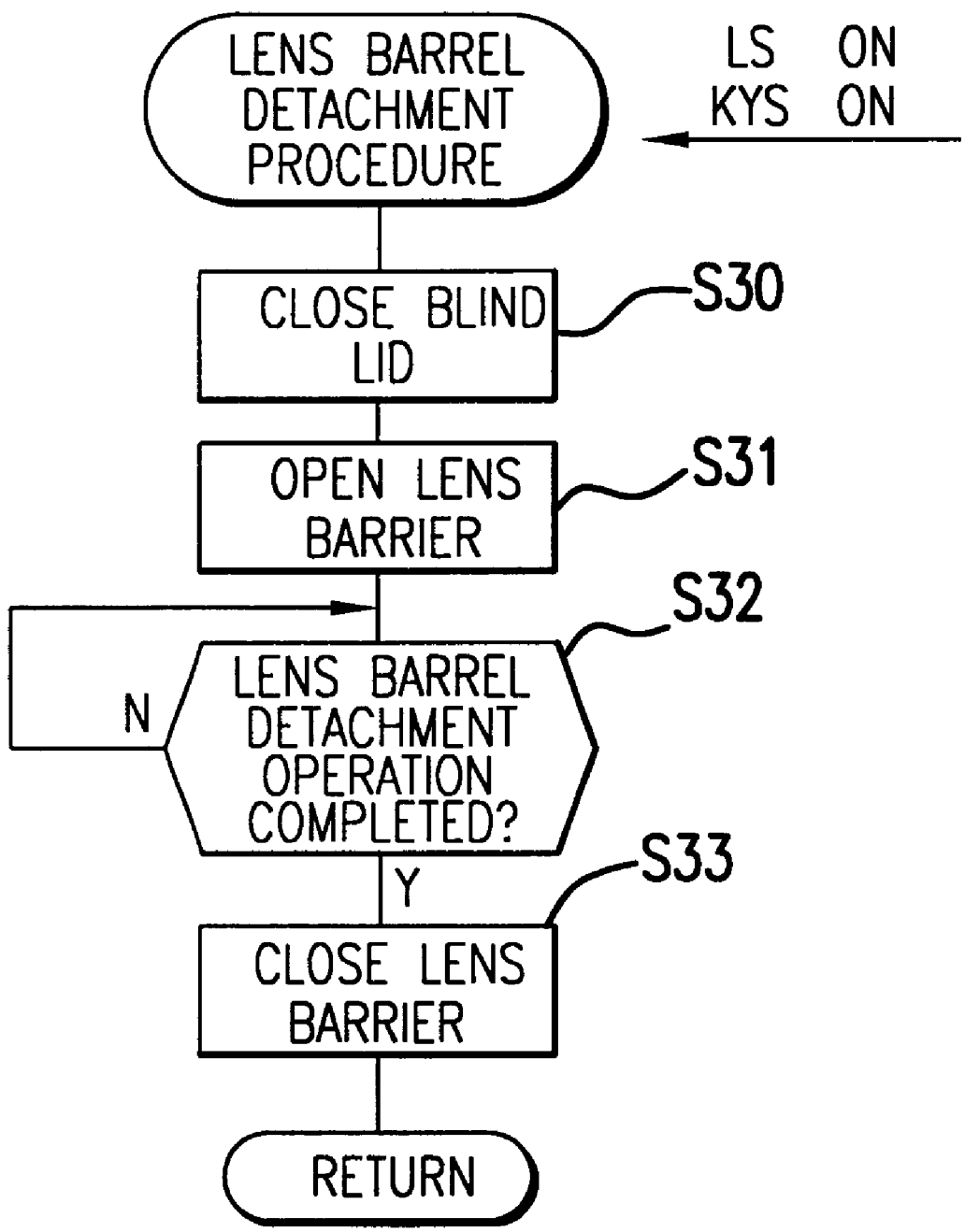
FIG. 15 is a flow chart showing the lens barrel detachment procedure performed by the control circuit of FIG. 12.

Control circuit 40 performs the necessary calculations and controls for shooting movement based on signals from the equipment and switches explained above, and in particular it performs the procedures of FIG. 13–FIG. 15, as special procedures relating to attachment and detachment of lens barrels 51 and 151. First, when power supply switch MSW is on, control circuit 40 determines whether a lens barrel is attached. If a lens barrel is not attached, control circuit 40 begins the lens barrel attachment procedure of FIG. 13. The installment of a lens barrel can be determined by whether lens barrel switch KYS is on. This is because when a lens barrel is attached, the lens barrel is inserted within camera body 1 with power supply switch MSW being off. As a result, lens barrel switch KYS is turned on. Whereas, when no lens barrel is attached, no on signal from lens barrel switch KYS can be obtained.

In the procedure of FIG. 13, first lens barrier 28 (see FIG. 4) is automatically opened, in step S10. By this, it becomes possible to attach a lens barrel to camera body 1. Next, in step S11, it is determined whether a lens barrel is attached by whether lens information has arrived from contact pin 11. If a lens barrel is attached, the process proceeds to step S12, and blind lid 13 is automatically folded to an open position. In step S13, lens barrier 28 is automatically closed. The completed attachment state of lens barrel 51 is shown in FIG. 4, and the completed attachment state of lens barrel 151 is shown in FIG. 9. If it is determined in step S11 that lens barrel attachment is not completed, the process proceeds to step S14 to determine whether power supply switch MSW is off. If it is off, the process proceeds to step S13, while if it is not off, it returns to step S11.

If an "on" signal is obtained from lens barrel switch KYS while power supply switch MSW is turned on, control circuit 40 performs the lens determination procedure shown in FIG. 14. In this procedure, first, in step S20, lens barrier 28 is automatically opened. Next, step S21 lens information from EEPROM 58 or 158 is read. In the next step S21, it is determined whether the shooting lens in the attached lens barrel is a fixed focal length lens. If it is a fixed focal length lens, the process proceeds to step S23, and automatically chooses the focussing mode as the control mode for lens barrel motor 21. If it is not a fixed focal length lens, the process proceeds to step S24 and automatically chooses the zooming mode as the control mode of lens barrel motor 21. Thus, for lens barrel 51, the focussing mode is chosen, and for lens barrel 151, the zooming mode is chosen. In the focussing mode, lens barrel motor 21 is controlled as a focussing motor for the shooting lens, and in the zooming mode, lens barrel motor 21 is controlled as a variable power motor for the shooting lens.

Figure 5:
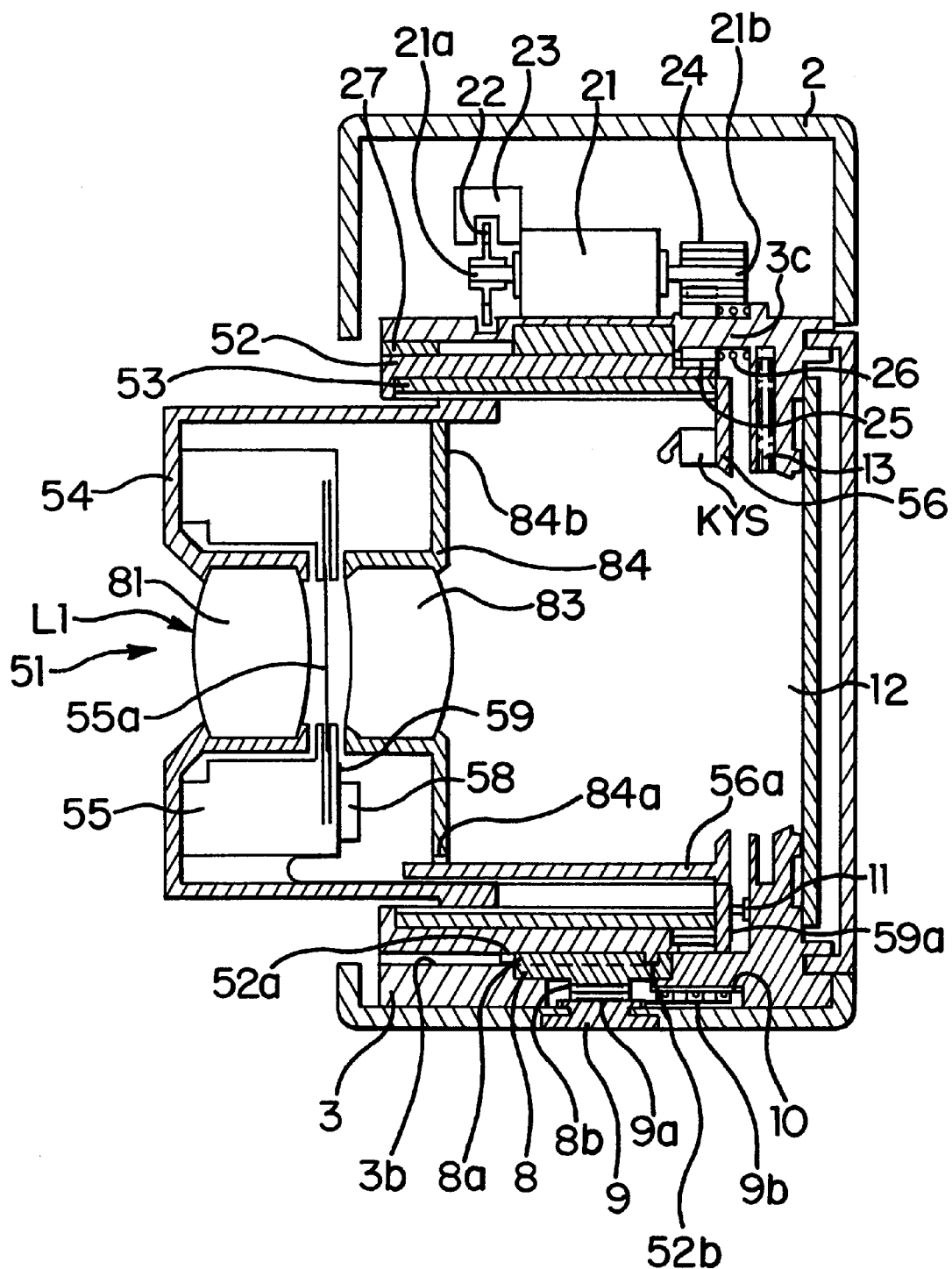
FIG. 5 is a side cross-sectional view showing the state when the lens barrel has been moved from the state in FIG. 4 to a shooting ready position.
Figure 10:
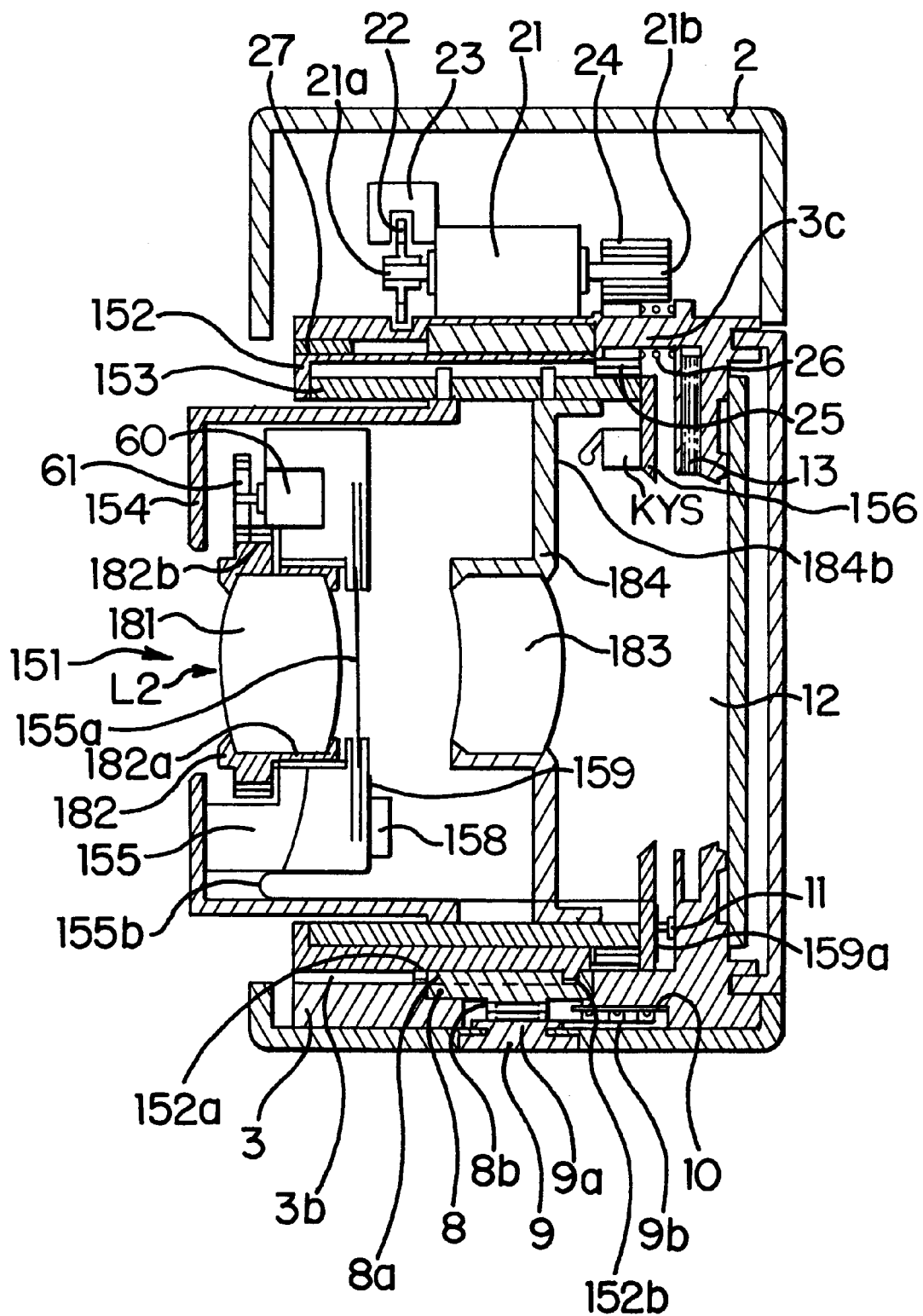
FIG. 10 is a side cross-sectional view showing the state when the lens barrel has been moved from the state in FIG. 9 to a shooting ready position.

After choosing a control mode for lens barrel motor 21, the process proceeds to step S25 and automatically drives lens barrel motor 21 a predetermined amount to move the lens barrel to a shooting ready position. A shooting ready position for lens barrel 51 is shown in FIG. 5, and a shooting ready position for lens barrel 151 is shown in FIG. 10. In addition, the position of FIG. 10 is that with the focal length for shooting lens L2 set at the wide edge (the limit for short focal length). Whether a shooting ready position has been reached is determined by counting the output pulses of photointerruptor 23 from the point at which lens barrel switch KYS is turned off. After the above steps, the lens determination procedure is ended.

After lens determining procedures, as described above, are finished, general shooting control is begun. In this shooting control, when half depression switch S1 is turned on, the object distance measuring procedure by range finder 41 is begun, and shooting lens focussing is performed according to the measured distance result. Here, when the focussing mode is chosen by the process in FIG. 14 as the control mode of lens barrel motor 21, lens barrel motor 21 drives according to the distance measurement results of range finder 41. On the other hand, when the zooming mode is chosen, focussing motor 60 inside lens barrel 151 is driven and focussing is performed. When full depression switch S2 is turned on, object luminance measurement is begun by photometry equipment 42. Based on the result, the most appropriate exposure amount is calculated. Based on this calculated result, shutter equipment 55 or 155 is driven, and film exposure is performed. After film exposure is completed, the lens barrel is returned to the shooting ready position, and the film is wound forward one frame by film advancing equipment 43. When power supply switch MSW is turned off, lens barrel 51 or 151 is moved to the fully inserted inside camera body position shown in FIG. 4 and FIG. 9, and lens barrier 28 is closed.

Figure 11:
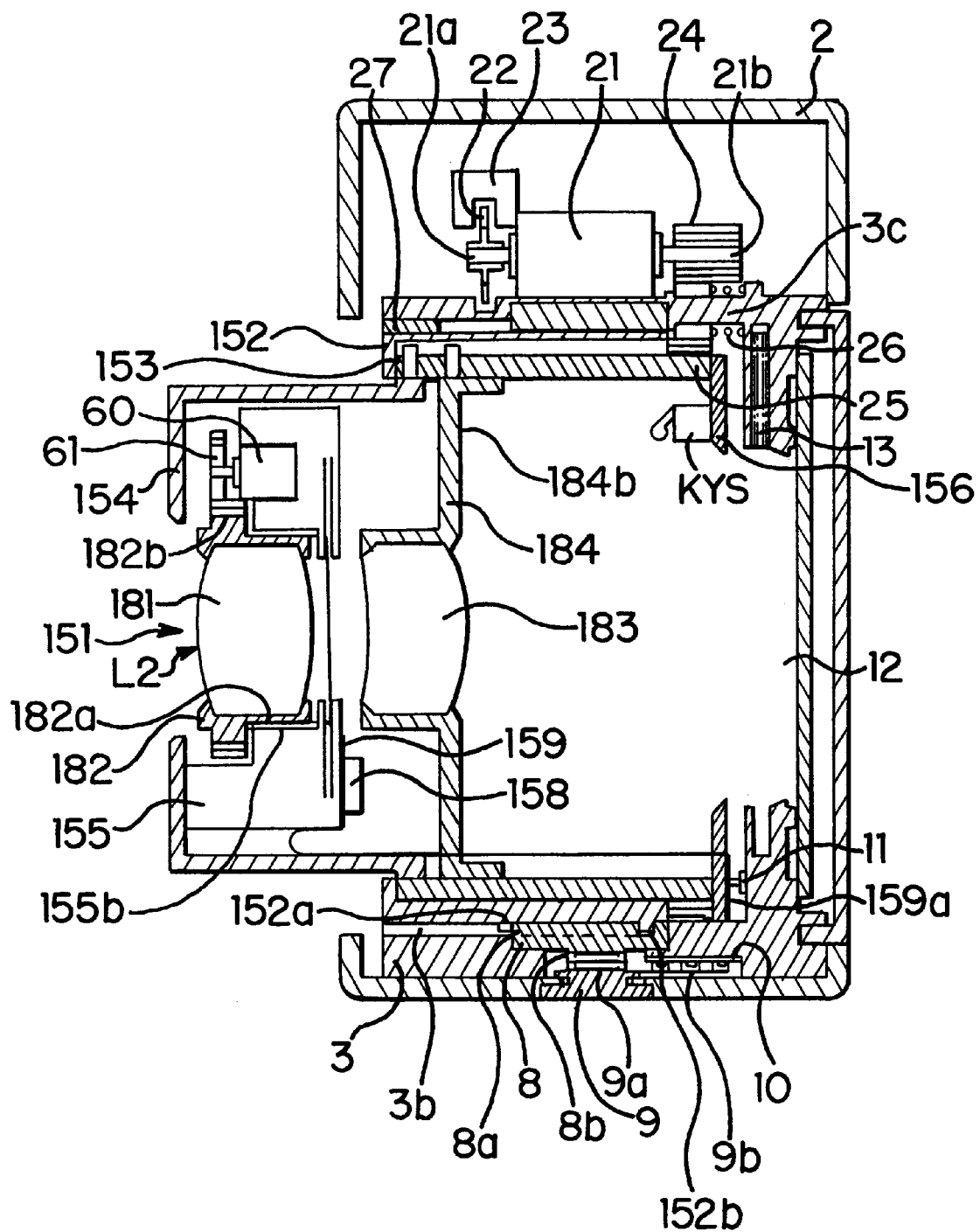
FIG. 11 is a side cross-sectional view showing the state when the lens barrel of FIG. 10 has been zoomed to the telephoto extreme.

When the above explained focussing mode is chosen, if an "on" signal is output from zoom up switch ZUS or zoom down switch ZDS, control circuit 40 ignores the signal. On the other hand, when the zooming mode is chosen and an "on" signal is output from zoom up switch ZUS or zoom down switch ZDS, control circuit 40 drives lens barrel motor 21 in a zoom up or zoom down direction for exactly as long as that "on" signal continues. Thus, when lens barrel 151 is attached, focal length for shooting lens L2 can be set at the desired value by the operation of zoom up switch ZUS or zoom down switch ZDS. FIG. 11 shows the state in which zoom up switch ZUS has been operated and focal length for shooting lens L2 has been set at the telephoto extreme (long focus limit value).

When lens barrel switch KYS is on, when lens barrel attach-detach lever 9 is moved in the detach direction, lens barrel attach-detach switch LS turns on, and control circuit 40 begins the lens barrel detachment procedure shown in FIG. 15. In this procedure, first, in step S30, blind lid 13 is automatically driven (see FIG. 3) so as to cover aperture 12. The reason for this is that, since shutter equipment 55 and 155 are built into lens barrels 51 and 151, when lens barrels 51 and 151 are removed, unless aperture 12 is covered by another element, the film will be exposed. After blind lid 13 is driven, lens barrier 28 is automatically opened in step S31. Because this makes lens barrel detachment possible, lens barrel attach-detach lever 9 is operated, and lens barrel 51 or 151 is removed from camera body 1. Control circuit 40 then determines if the lens barrel detachment operation is complete in step S32 after release of lens barrier 28. In this operation, the user notifies control circuit 40 of completion of lens barrel detachment, by, for example, slide operation of lens barrel attach-detach lever 9 or depression operation of release button 4. When it is determined that lens barrel detachment operation is complete, the process proceeds to step S33 and automatically closes lens barrier 28, thus ending the lens barrel detachment procedure.

In the above embodiment, lens barrel motor 21, pinion gear 24, and coupling gear 25 constitute the camera body drive mechanism; drive barrel 53 of lens barrel 51 and drive barrel 153 of lens barrel 151 constitute the lens barrel drive element; EEPROM 58 and 158 constitute information providing elements; focussing motor 60 and pinion gear 61 of lens barrel 151 constitute the lens barrel focussing mechanism; and front lens unit 181 of lens barrel 151 constitutes the focussing photometry system. Also, control circuit 40 constitutes a control device, a determination device and a control conditions changing device.

In addition, while two lens barrels 51 and 151 were given as examples, it is acceptable to have three or more interchangeable lens barrels. However, it is necessary that engaging parts with coupling gear 25, lens barrel diameter, rotation restriction groove 3b, and the joining part with cam groove 8a be the same in all lens barrels. It is not necessary to construct all lens barrels so that they fit completely behind lens barrier 28. The drive mechanism of camera body 1 is described as the motor movement power supply, but mechanisms that provide lens barrel drive power through user manual operation are also acceptable. Information providing elements are not limited to EEPROMs, but could also include multiple contact points between the lens barrel and camera body that would distinguish lens type by their transmission pattern. It is also possible to have the camera body detect the protrusions and depressions built into the lens barrel and distinguish the lens type. Uses of the drive mechanism of the camera body are also not limited to focussing and variable power, but it can also be used in conjunction with a drive system to realize other functions (for example, a shutter drive system, a shutter charge system, or a diaphragm blade drive system).

As explained above, through the camera according to the present invention, drive power from the drive mechanism can always be used appropriately and lens barrels can be driven without waste. Further, lens barrel size can be decreased because the drive mechanism inside the camera body can be used according to the lens barrel type. In addition, with the camera according to the present invention, there is no requirement of a special operation on the user's part to distinguish the lens barrel type, because the lens barrel type can be distinguished by the camera body.

Also, with the camera according to the present invention, inclusion in a lens barrel equipped with a single focal length lens of a motor is rendered unnecessary and the separate drive mechanism installed inside a lens barrel equipped with a variable focal length lens can be made smaller. A decrease in lens barrel size can be achieved, because the camera body drive mechanism can be switched to focussing for a single focal length lens and to variable power for a variable focal length lens. In addition, with the camera according to the present invention, a special operation on the user's part to distinguish lens type is not required because the camera body can distinguish if the shooting lens of the lens barrel is of fixed focal length or variable focal length. With the camera according to the present invention, focussing operation and variable power operation of a variable focus lens can be efficiently performed by the drive mechanism of the camera body and the focussing mechanism of the lens barrel.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A camera kit having component parts capable of being assembled together, the kit comprising the combination of:
    an interchangeable lens camera comprising a camera body and a drive mechanism including a generating source of drive power in said camera body; and
    a plurality of interchangeable lens barrels, each attachable to said camera body, each of said plurality of interchangeable lens barrels including a drive element that connects to said drive mechanism and a connecting structure, the connecting structure providing a connection between one of said plurality of interchangeable lens barrels and said camera body, wherein a) one of a plurality of predetermined functions corresponds to each drive element, b) the drive mechanism drives each drive element to perform the one of a plurality of predetermined functions corresponding to each drive element, c) the plurality of predetermined functions comprises focusing and changing a focal length, and d) the plurality of interchangeable lens barrels includes a first lens barrel having a fixed focal length shooting lens and a second lens barrel having a variable focal length shooting lens.

2. The camera kit of claim 1, wherein each said connecting structure comprises a flexible printed circuit board.

3. The camera kit of claim 1, wherein each said connecting structure comprises an information providing element that is different for each of said plurality of interchangeable lens barrels to provide to said camera body information to determine which one of said plurality of interchangeable lens barrels is attached to said camera body.

4. The camera kit of claim 3, wherein said information providing element comprises an EEPROM.

5. The camera kit of claim 1, wherein said interchangeable lens camera has an electrical contact point and said connecting structure comprises an electrical contact with a memory attached thereto, and wherein upon assembly of said interchangeable lens barrel into said interchangeable lens camera, electrical connection is completed through said connecting structure and information from the memory is transferred from the interchangeable lens barrel to the interchangeable lens camera.

6. The camera kit of claim 1, wherein;
    said drive element of said first lens barrel operates focusing of said fixed focal length shooting lens when said first lens barrel is attached to said camera body,
    said drive element of said second lens barrel operates focal length changes of said variable focal length shooting lens when said second lens barrel is attached to said camera body,
    said first lens barrel includes an information providing element to provide said camera body with information that said first lens barrel includes a fixed focal length shooting lens, and
    said second lens barrel includes an information providing element to provide said camera body with information that said second lens barrel includes a variable focal length shooting lens.

7. The camera kit of claim 6, wherein said second lens barrel further comprises:
    a focusing optical system; and
    a focusing mechanism including a generating source of drive power to focus said focusing optical system.

8. The camera kit of claim 6, wherein said first lens barrel comprises a movable barrel fixedly coupled to a lens assembly, said movable barrel having a helicoid screw formed thereon, and wherein said drive element comprises a drive barrel having a mating helicoid screw formed thereon that mates with said helicoid screw of said movable barrel such that upon driving of said drive barrel said movable barrel moves to change a focus position of said lens assembly.

9. The camera kit of claim 6, wherein said second lens barrel comprises a movable barrel and a rear-unit holding barrel, each independently coupled to said lens assembly, each having a cam follower thereon, and wherein said drive element comprises a drive barrel having a pair of cam grooves formed therein, each cam groove engaging one of said cam followers such that, upon driving of said drive barrel, said movable barrel and said rear-unit holding barrel move to change a focal length of said variable focal length shooting lens.

10. The camera kit of claim 1, wherein said drive mechanism of said interchangeable lens camera comprises a gear assembly connected to said generating source of drive power and said drive element of each of said lens barrels comprises a drive barrel with a lens barrel gear, and wherein said gear assembly engages said lens barrel gear to drive said lens barrel upon assembly.

11. The camera kit of claim 1, wherein:
    said interchangeable lens camera further comprises a controller coupled to said drive mechanism and a contact coupled to said controller,
    wherein said connecting structure connects with said contact upon assembly of one of said interchangeable lens barrels into said interchangeable lens camera and enables information to be provided to said controller from said interchangeable lens barrel to drive said drive mechanism under predetermined conditions particular to said assembled interchangeable lens barrel.

12. A camera body capable of having different lens barrels attached thereto, each lens barrel having a drive element that performs a particular one of a plurality of functions, the plurality of functions comprising focusing and changing a focal length, the camera body comprising:

drive means including a generating source of drive power for driving a drive element in an attached lens barrel to perform the particular function for the lens barrel, said drive means being capable of driving a drive element to focus a lens barrel and driving a drive element to change a focal length of a lens barrel;

control means coupled to said drive means for operating said drive means according to determined control conditions to perform the particular function for the lens barrel, said control means being capable of controlling said drive means to drive a drive element to focus a lens barrel and drive a drive element to change a focal length of a lens barrel, said control means including determining means for determining which lens barrel of the different lens barrels is attached to the camera body and associated control conditions, and control conditions changing means for changing the control conditions based on the lens barrel as determined by said determining means.

13. The camera body of claim 12, wherein said control conditions changing means changes the control conditions based on whether the attached lens barrel includes a fixed focal length lens or variable focal length lens as determined by said determining means, so that when said determining means determines that the attached lens barrel is a fixed focal length lens said drive means drives the drive element in the attached lens barrel to focus the fixed focal length lens, and when said determining means determines that the attached lens barrel is a variable focal length lens, said drive means drives the drive element in the attached lens barrel to change focal length of the variable focal length lens.

14. An interchangeable lens barrel, capable of being connected to a camera body having a drive mechanism including a generating source of drive power, comprising:

a lens assembly having a variable focal length, a focusing optical system and a focusing mechanism including a generating source of drive power to focus said focusing optical system;

a drive element coupled to said lens assembly and capable of connection to the drive mechanism in the camera body, wherein the drive element operates to vary the focal length of the lens assembly; and an information providing element containing information regarding the variable focal length lens assembly and capable of providing information to the camera body upon connection regarding the variable focal length lens assembly to instruct the drive mechanism to drive said drive element to vary the focal length of the lens assembly and not to drive said drive element to focus said focusing optical system.

15. A method of connecting and operating a lens barrel attached to a camera body, wherein the camera body comprises a control device to control camera functions and a drive mechanism with a power supply located in the camera body, and wherein the lens barrel comprises a lens assembly, a lens barrel switch to indicate attachment of the lens barrel, a drive element to drive the lens assembly, and an information providing element, the method comprising the steps of:

assembling the lens barrel onto the camera body;

detecting attachment of the lens barrel;

establishing contact between the lens barrel information providing element and the control device of the camera body and transferring information regarding driving control conditions for the particular attached lens barrel to the control device; and controlling driving of the drive mechanism to drive the drive element of the lens barrel to change a focal length of the lens assembly and not to drive the drive element to focus a focusing optical system of the lens assembly, where the information transferred from the information providing element to the control device indicates that the lens barrel is a variable focal length shooting lens.

16. The method of claim 15, wherein the step of transferring information includes establishing the type of lens barrel attached.

17. The method of claim 16, wherein the step of establishing the type of lens barrel attached includes determining whether the attached lens barrel is a fixed focal length shooting lens or a variable focal length shooting lens.

* * * * *